(No Model.)
T. MIDGLEY.
CRANK AXLE AND SPROCKET FOR BICYCLES.
No. 596,523. Patented Jan. 4, 1898.
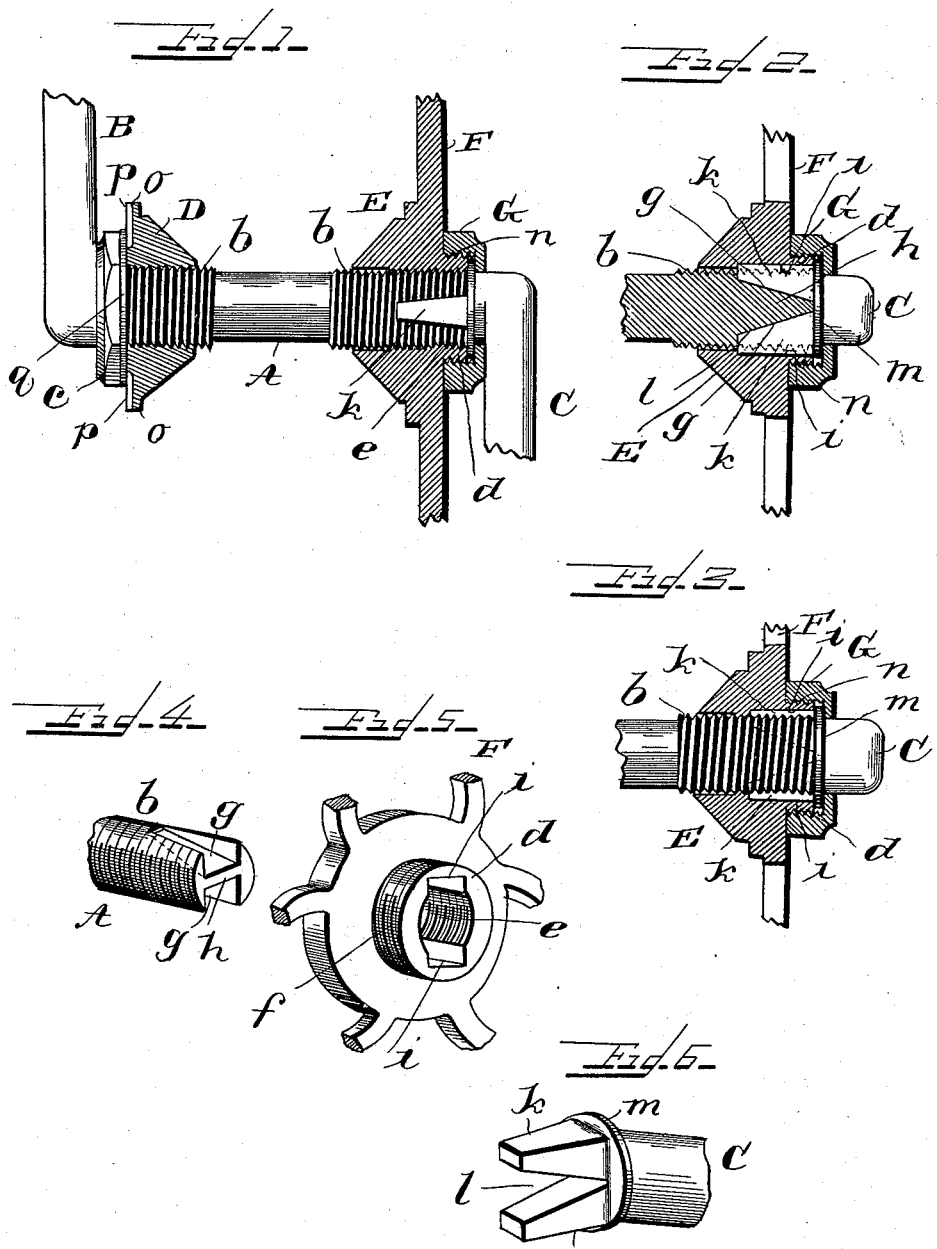

UNITED STATES PATENT OFFICE.

THOMAS MIDGLEY, OF COLUMBUS, OHIO, ASSIGNOR OF ONE-HALF TO THE COLUMBUS BICYCLE COMPANY, OF SAME PLACE.

CRANK-AXLE AND SPROCKET FOR BICYCLES.

SPECIFICATION forming part of Letters Patent No. 596,523, dated January 4, 1898.

Application filed February 13, 1897. Serial No. 623,298. (No model.)

*To all whom it may concern:*

Be it known that I, THOMAS MIDGLEY, a citizen of the United States, residing at Columbus, in the county of Franklin and State of Ohio, have invented certain new and useful Improvements in Crank-Axles and Sprockets for Bicycles; and I do hereby declare the following to be a full, clear, and exact description of the invention, such as will enable others skilled in the art to which it appertains to make and use the same.

My invention relates to bicycles, has especial reference to the crank-axle and sprocket by which the vehicle is propelled, and has for its object improvements in construction whereby the crank-axle can be readily applied to and removed from the crank-bearings, as will be fully disclosed in the following specification and claims.

In the accompanying drawings, which form part of this specification, Figure 1 represents a side elevation of the crank-axle, the sprocket and cones being shown in vertical section; Fig. 2, a horizontal section through the sprocket, one end of the axle, and one of the cones; Fig. 3, a like view showing the axle in side elevation; Fig. 4, a detail perspective of the free end of the axle; Fig. 5, a like view of the sprocket, and Fig. 6 a like view of the inner end of the free crank.

Reference being had to the drawings and the letters thereon, A indicates the axle; B, one of the cranks, integral with the axle, and C the free or separate crank. The axle is provided with screw-threads $b$ $b$, of the same pitch and both left-hand threads, to receive the internally-screw-threaded cones D and E, the clamping-nut $c$ outside of the cone D, and the sprocket-wheel F, of which the cone E forms an integral part, and the hub $d$ of the sprocket-wheel is also internally screw-threaded with a left-hand thread $e$ and an external right-hand thread $f$. The end of the axle is provided with double inclined slots or seats $g$ $g$, forming substantially an inverted-V or wedge-shaped projection $h$ between the seats, and said slots or seats extend into the hub of the sprocket at $i$ $i$ diametrically opposite each other, so that the strain on the crank C is distributed upon the axle and the sprocket-wheel to propel the vehicle.

At the inner end of the crank C are formed two projections $k$ $k$, having an inclined or wedge shaped space $l$ between them which engages the projection $h$ on the end of the axle, and the projections $k$ $k$ enter and engage the slots or seats $g$ $g$ on the axle and the seats $i$ $i$ in the hub of the sprocket-wheel F. Adjacent to the projections $k$ $k$ is a collar $m$, which is engaged by a nut G, which is internally screw-threaded at $n$ and engages the external screw-thread $f$ on the hub $d$ of the sprocket-wheel and secures the crank to the axle and the members of the coupling formed by the seats and projections on the end of the axle and the crank C in operative position.

The outer surface of the flange $o$ on the cone D is provided with a plurality of grooves or notches $p$ for the purpose of adjusting the cone by use of a punch, nail, or other suitable implement to compensate wear of the cone or the friction-rolls, (not shown,) and between said flange and the nut $c$ a washer $q$ is interposed.

By the construction of the coupling shown the strain and power are distributed to the axle and the sprocket-wheel with the least sacrifice of strength to the parts involved, and crank C and sprocket F can be readily and quickly detached from the axle for repairs.

Having thus fully described my invention, what I claim is—

1. A crank axle or shaft having one crank integral with the axle and a screw-thread on the free end thereof, a separate crank, a sprocket-wheel having oppositely-arranged slots or seats in the bore of the hub and an internal screw-thread engaging the thread on the axle, a slot in said axle, an external screw-thread on said hub and means on the crank for engaging the axle and sprocket slots, in combination with a nut engaging said crank and the hub of the sprocket-wheel.

2. A crank axle or shaft having one crank integral with the axle, a double inclined slot or seat in the end of the axle, and a screw-thread on said end, in combination with a sprocket-wheel having oppositely-arranged slots or seats in the bore of the hub forming a continuation of the slots in the end of the axle, and an internal screw-thread engaging the thread on the end of the axle, a crank having inclined projections on its inner end engaging the inclined seats on the axle and the slots in the hub, an external screw-thread on said hub and a nut connecting the crank to the axle and to the sprocket.

In testimony whereof I affix my signature in presence of two witnesses.

THOMAS MIDGLEY.

Witnesses:
H. D. FREEMAN,
JOHN R. YUNG.